(No Model.) 3 Sheets—Sheet 1.
C. A. WEEKS.
APPARATUS FOR TREATING GARBAGE.
No. 550,664. Patented Dec. 3, 1895.
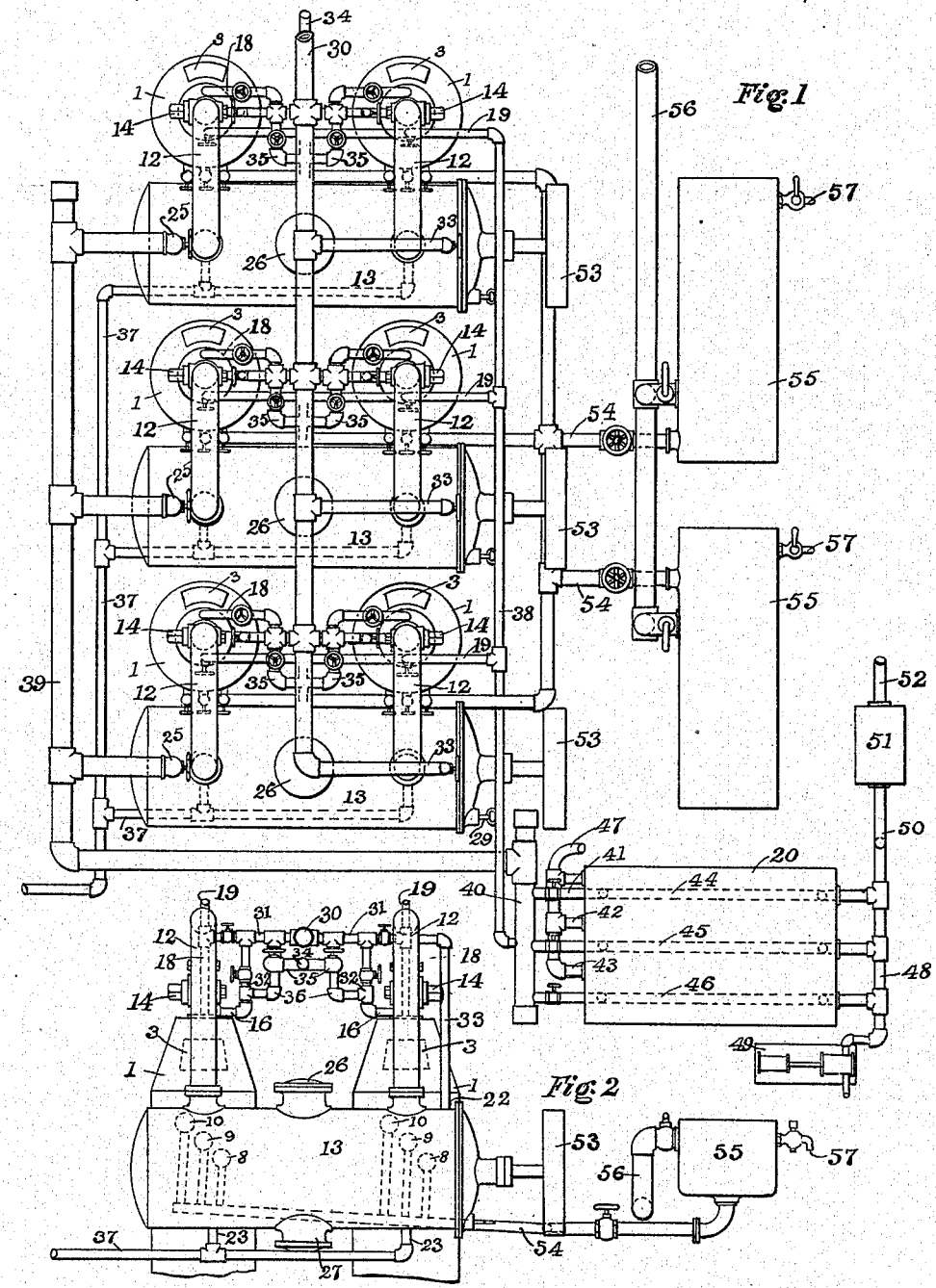
WITNESSES:
Edward R. Zoll
Jno. A. Carlisle
INVENTOR
Charles A. Weeks
BY
Augustus B. Stoughton
ATTORNEY

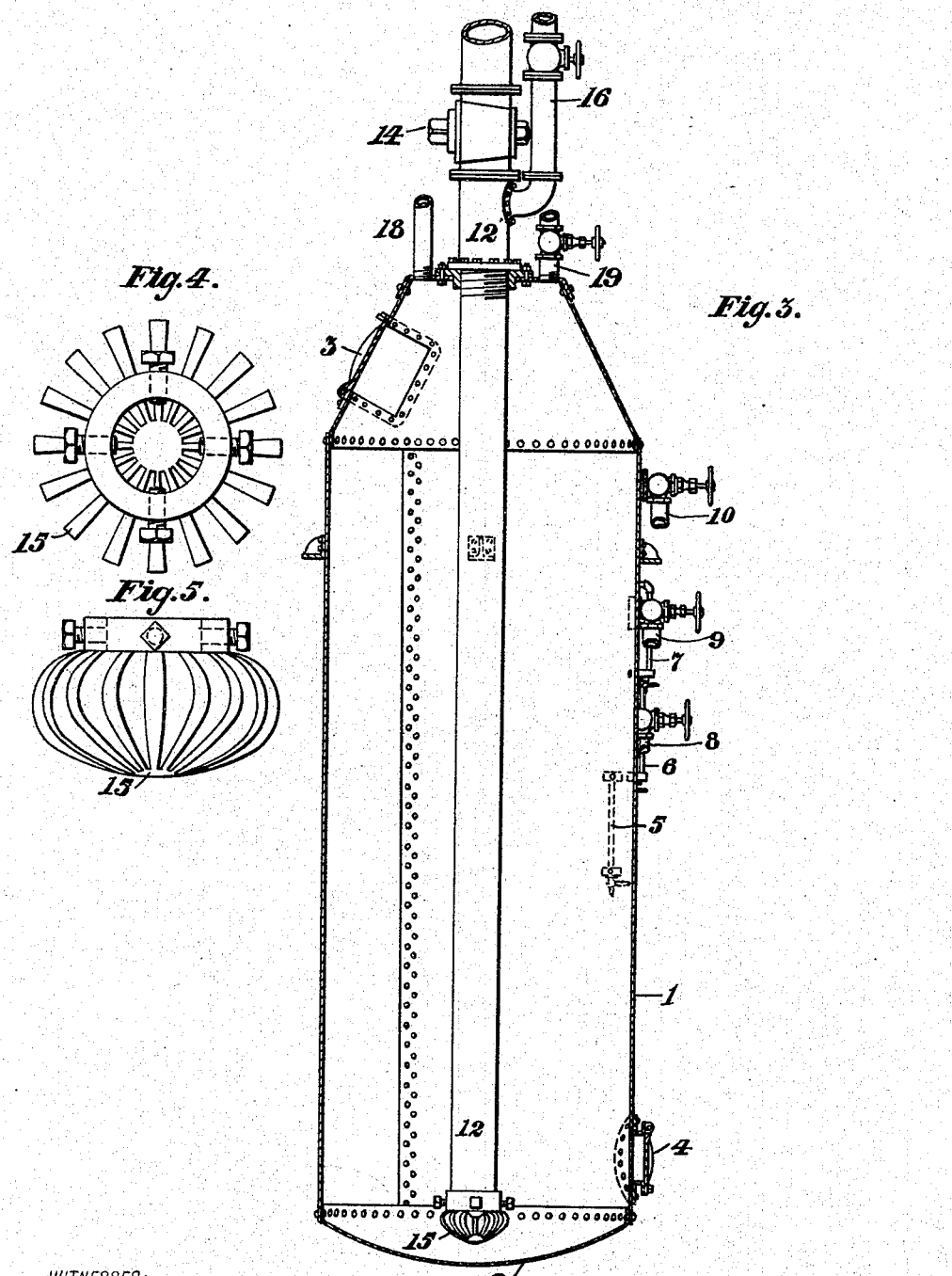

(No Model.) 3 Sheets—Sheet 3.

C. A. WEEKS.
APPARATUS FOR TREATING GARBAGE.

No. 550,664. Patented Dec. 3, 1895.

WITNESSES:
Edward R. Zoll
Jno. A. Carlisle

INVENTOR
Charles A Weeks
BY
Augustus B. Stoughton
ATTORNEY

UNITED STATES PATENT OFFICE.

CHARLES A. WEEKS, OF PHILADELPHIA, PENNSYLVANIA.

APPARATUS FOR TREATING GARBAGE.

SPECIFICATION forming part of Letters Patent No. 550,664, dated December 3, 1895.

Application filed June 3, 1895. Serial No. 551,443. (No model.)

*To all whom it may concern:*

Be it known that I, CHARLES A. WEEKS, a citizen of the United States, residing at the city of Philadelphia, in the county of Philadelphia and State of Pennsylvania, have invented certain new and useful Improvements in Apparatus or Plants for Treating Garbage and the Like, of which the following is a specification.

The principal object of my present invention is to provide a simple, convenient, efficient, and comparatively inexpensive apparatus or plant for continuously treating garbage in the condition in which it is collected for the production of an excellent fertilizer and for the conservation of grease and without exposing or uncovering the garbage and without the escape of unpleasant odors, fumes, or gases; and to this end my invention consists of the improvements hereinafter described and claimed.

The nature, characteristic features, and scope of my invention will be more fully understood from the following description, taken in connection with the accompanying drawings, forming part hereof, in which—

Figure 6:
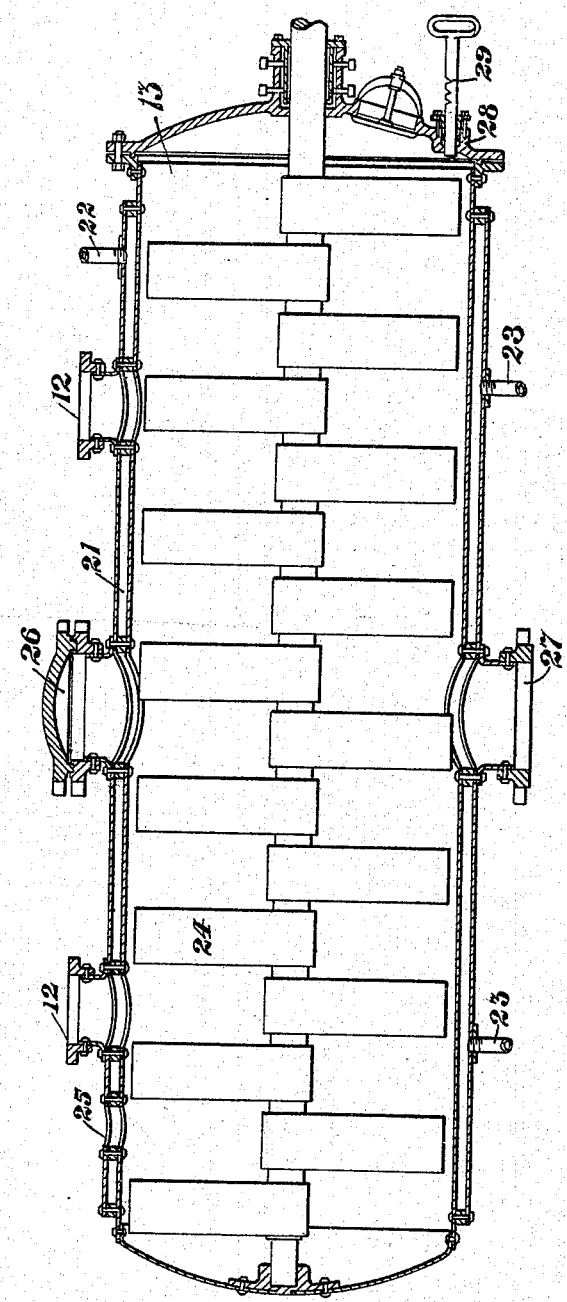
Figure 7:
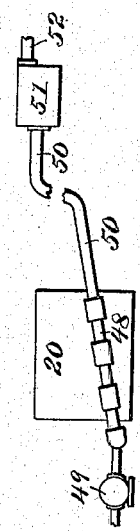

Figure 1 is a diagrammatic view illustrating a plant or apparatus embodying features of my invention and showing a condenser, three driers, a pair of digesters for each drier, and their complemental connections. Fig. 2 is an elevational view of one of the driers and its complemental digesters shown in Fig. 1. Fig. 3 is a central sectional view drawn to an enlarged scale and illustrating one of the digesters shown in Figs. 1 and 2. Figs. 4 and 5 are respectively plan and elevational views drawn to an enlarged scale and illustrating the strainer shown at the bottom of Fig. 3. Fig. 6 is a sectional view illustrating one of the driers shown in Figs. 1 and 2, and Fig. 7 is an elevational view of parts of the apparatus shown at the right-hand side of Fig. 1.

In the drawings, 1 is a digester, having in the present instance a dome-shaped bottom 2 and provided with an inlet 3 for garbage, a hand-hole 4 for the removal of solid matter, sight-gages 5, 6, and 7, and valved grease-offtakes 8, 9, and 10.

12 is a pipe penetrating the top of the sealed digester 1 and extending nearly to the dome-shaped bottom 2 thereof, and also communicating with the interior of the drier 13.

14 is a valve interposed in the pipe 12. As shown in the drawings, this valve is of the plug type, whereby it is adapted to control the passage of thick, heavy, or sticky liquids without becoming caked or clogged therewith.

At the end of the pipe 12, near the domeshaped bottom 2, is mounted a strainer 15 for a purpose to be presently described.

16 is a valved pipe, through which steam may be introduced into the pipe 12 below its valve 14.

The valve 14 may be made of the three-way type, in which case the pipe 16 is not valved, as shown, but is led into communication with and controlled by the additional or third way of the valve 14.

The top of the digester 1 may be provided with a valved steam or hot-air pipe 18 and with a valved pipe 19 for conducting gases to a condenser 20, as will be hereinafter more fully explained, or directly beneath the boiler for consumption. However, a pump interposed in the pipe 12 may be employed, in which case the steam-pipe 18 may be dispensed with.

The drier 13 is heated through the instrumentality of a steam-jacket 21, having a steam-inlet connection 22 and a water-outlet connection 23, and is provided with revoluble beaters 24 and an outlet 25, that communicates with the condenser, as will be hereinafter explained.

26 is an inlet, through which any substance that may be required for admixture with the dried or drying garbage may be admitted, and 27 is an outlet, through which the finished fertilizer may be removed.

28 is a stuffing-box located at some suitable point in the casing of the drier and through which a notched rod 29 is afforded a range of motion, so that the condition of dryness of the contents of the drier may be readily ascertained by the simple operation of stopping the beaters 24, pushing the rod 29 inward, and then withdrawing it, whereby its notches are caused to present a sample of the contents for inspection and examination.

Referring to Fig. 1, I have shown three driers connected, respectively, with two digesters, although the number of driers and number of digesters co-operating with each drier is not material; but by providing each drier with at least two digesters and operating them alternately the operation may be made practically continuous.

30 is a main steam-pipe, which leads from a boiler and supplies steam to the entire apparatus. This pipe 30 is provided at each set of digesters and their drier or driers with branches 31 and 32, that communicate with the steam-inlet pipes 18 and 16, respectively, of each digester and with a branch 33, that communicates with the steam-jacket of the corresponding drier.

34 is a hot-water pipe that communicates with any suitable source of supply—for example, a boiler—and is provided with valved branches 35, that communicate with pipes 36, that lead to the pipes 31 and 16 of each of the digesters. The object of these hot-water connections is twofold: first, to permit of the introduction of water into the pipe 12 and digester 1, or both, for the purpose of cleaning it or them, and, second, to permit of the introduction of water into the digester 1 for the purpose of floating grease, for example, in such manner that it may be drawn off from the grease-offtakes.

Water of condensation is led away from the steam-jacket of each of the driers through a pipe 37. The pipes 19 of each of the digesters communicate with a pipe 38, and the offtake 25 of each of the driers communicates with a pipe 39, and these pipes 38 and 39 communicate in turn with a condenser-pipe 40, having valved branches 41, 42, and 43, that communicate with sets of coils 44, 45, and 46, that appertain to the condenser 20.
Cold water is supplied to the exterior of the coils of this condenser by means of a water-pipe 47 and preferably in such manner that the cold water enters the condenser and flows upon its coils at or near the point where the contents thereof are leaving the condenser, and the object of providing the branches 41, 42, and 43 and the sets of coils 44, 45, and 46 is to permit of the utilization of only a part of the condenser, for example, when one or more of the driers are not in use. The volatile products that enter the condenser are cooled, and thereby caused to deposit their moisture, which consists principally of water, and which by reason of its weight passes through the pipe 48 and may be drawn by means of the pump 49 and discharged into a suitable receptacle or otherwise disposed of. The gases which are not condensed are or may be odoriferous. However, by reason of their lightness they rise from the fluid and pass through the pipe 50, (shown in elevation on Fig. 7,) and may be enriched by leading them through a vessel 51 and over a supply of liquid hydrocarbon. Subsequently these enriched gases may be conducted, for example, through the pipe 52, and burned under the boilers which supply steam to the apparatus.

Power is applied from a prime mover (not shown) for rotating the beaters 24, for example, through the intervention of the pulleys, wheels, or gears 53.

54 is a valved and branched pipe for conveying grease from the offtakes 8, 9, and 10 of each of the digesters to a point at or near the bottom of a grease tank or tanks 55, and 56 is a pipe provided with suitable valved branches for discharging water at or near the top of the tanks 55, the object being to cause the grease to rise through the water, and thus become purified. The purified grease may be drawn off for use through spigots 57.

The mode of operation of my improved plant or apparatus may be described as follows: The valve 14 and all the other connections of one or more of the digesters being closed, garbage or the like as it is collected—that is to say, containing foreign solid matter with or without any suitable chemical, as sulphuric acid or other substance or material—is dumped or otherwise introduced through the inlet 3, and the latter is subsequently closed. Steam is then introduced through the pipes 16 and 12 and is discharged under the influence of the strainer 15 and dome-shaped bottom 2 in such manner that it reaches substantially all parts of the garbage and contents of the digester, with the result that grease is separated and the remainder is reduced to a liquid or pulpy condition from, which the foreign or solid matter falls to the bottom of the digester, and this foreign or solid matter is subsequently removed through the hand-hole 4. During this operation the evolved or liberated gases may be drawn off by way of the pipes 19, 38, and 40 through the condenser 20 and hydrocarbon-tank 51, and thence by way of the pipe 52 to the boiler, (not shown,) where they are consumed. Supernatant grease is drawn off by way of the outlets 8, 9, or 10, and pipes 54 to the bottom of the tanks 55, at the top of which water is introduced, so that the grease rises through the water and may be drawn off at 57 and preserved for any required use. In this connection it may be remarked that the supply of steam to the digester 1 may be increased or diminished through the intervention of the valve of the pipe 16 for the purpose of controlling the separation of grease. Subsequently the steam-pipe 16 and grease-outlets are closed, the valve 14 is opened, and steam is admitted through the pipe 18 into the top of the digester with the result that it forces the contents thereof from which the grease has been drawn off through the pipe 12 into the drier 13. If desired and for the purpose of producing a fertilizer, powdered material, as phosphate rock, may be introduced into the drier. The paddles 24 of the drier agitate its contents, while at the same time the steam-jacket imparts heat thereto, so that the same are thoroughly dried and may be withdrawn at the outlet 27 and subsequently used as a fertilizer. During this operation the gases evolved or liberated are drawn off by way of the pipes 39 and 40 and through the coils of the condenser from which the liquid is drawn by way of the pipe 48 and pump 49, while the gases rise through the pipe 50 and are led through the hydrocarbon-tank 51, in which they are enriched preparatory to being burned beneath the boiler or otherwise disposed of. The condition of dryness of the contents of the drier may be ascertained whenever it becomes necessary or desirable by means of the rod 29 and without opening the drier, which of course is advantageous.

It will be obvious to those skilled in the art to which my invention appertains that modifications may be made in details without departing from the spirit thereof. Hence I do not limit myself to the precise construction and arrangement of parts hereinabove set forth and illustrated in the accompanying drawings; but,

Having thus described the nature and objects of my present invention, what I claim as new, and desire to secure by Letters Patent, is—

1. The combination in an apparatus for treating garbage, of a digester, a drier, a valved pipe communicating with the drier and extending through the top and terminating near the bottom of the digester, valved connections for introducing steam into said pipe, and valved connections for introducing steam at the top of the digester, substantially as described.

2. The combination in an apparatus for treating garbage, of a digester having a dome-shaped bottom, a pipe penetrating the top of the digester and terminating in a strainer near said dome-shaped bottom, valved connections for introducing steam through said pipe, and valved connections for introducing steam directly into the top of the digester, substantially as described.

3. The combination in an apparatus for treating garbage, of a digester provided with off-takes, a valved pipe penetrating the top of the digester and terminating in a strainer near its dome shaped bottom, a hand-hole near said strainer, steam connections for introducing steam into said pipe, and steam connections for introducing steam directly into the top of the digester, substantially as described.

4. The combination in an apparatus for treating garbage, of a drier, a digester, a valved pipe communicating with the drier and terminating near the bottom of the digester, valved steam connections for supplying steam through said pipe and at the top of the interior of the digester and to the jacket of the drier, a grease tank, pipe connections for connecting said tank and digester, water pipe connections for the grease tank, a condenser pipe and condenser for drawing off fumes from said parts, and a hydro-carbon tank and connections for enriching the non-condensable constituents of the fumes, substantially as described.

5. The combination in an apparatus for treating garbage, of a digester, a pipe penetrating the top of the digester and terminating near its bottom, pipe connections communicating with said pipe and with the top of the digester, and steam and water mains communicating with said pipe connections, substantially as described.

6. The combination in an apparatus for treating garbage, of a digester having a hand-hole near its bottom, a pipe extending through the top of the digester and terminating near its bottom, and steam connections for introducing steam into said pipe, substantially as described.

7. The combination in an apparatus for treating garbage, of a digester, a pipe extending through the top of the digester and terminating near its bottom, fittings or connections for introducing steam through said pipe, and means for withdrawing the fluid contents of the digester by way of said pipe, substantially as described.

In testimony whereof I have hereunto signed my name.

CHARLES A. WEEKS.

In presence of—
ALFRED J. WILKINSON,
A. B. STOUGHTON.